(12) United States Patent
Curlier et al.

(10) Patent No.: US 9,988,937 B2
(45) Date of Patent: Jun. 5, 2018

(54) HYDRAULIC AND ELECTRICAL INTERFACE RING FOR A TURBINE ENGINE

(71) Applicant: SNECMA, Paris (FR)

(72) Inventors: Augustin Curlier, Paris (FR); Olivier Belmonte, Paris (FR)

(73) Assignee: SNECMA, Paris (FR)

( * ) Notice: Subject to any disclaimer, the term of this patent is extended or adjusted under 35 U.S.C. 154(b) by 504 days.

(21) Appl. No.: 14/431,173

(22) PCT Filed: Sep. 24, 2013

(86) PCT No.: PCT/FR2013/052227
§ 371 (c)(1),
(2) Date: Mar. 25, 2015

(87) PCT Pub. No.: WO2014/049257
PCT Pub. Date: Apr. 3, 2014

(65) Prior Publication Data
US 2015/0252690 A1    Sep. 10, 2015

(30) Foreign Application Priority Data

Sep. 28, 2012 (FR) ..................... 12 59207

(51) Int. Cl.
*F02C 7/06* (2006.01)
*F01D 25/18* (2006.01)
(Continued)

(52) U.S. Cl.
CPC .............. *F01D 25/18* (2013.01); *F01D 7/00* (2013.01); *F16C 33/6677* (2013.01);
(Continued)

(58) Field of Classification Search
USPC ......... 60/39.08, 39.091, 39.23, 39.29, 39.55, 60/732, 734, 737, 794
See application file for complete search history.

(56) References Cited

U.S. PATENT DOCUMENTS 5,819,540 A * 10/1998 Massarani ................. F23R 3/26
                                                                251/212
7,100,354 B2 * 9/2006 Opper ................... F01D 21/003
                                                                60/223
(Continued)

FOREIGN PATENT DOCUMENTS

| JP | S50-82421 U | 7/1975 |
| JP | 2003-042372 A | 2/2003 |

OTHER PUBLICATIONS

Written Opinion of the International Searching Authority dated Feb. 3, 2014, issued in corresponding International Application No. PCT/FR2013/052227, filed Sep. 24, 2013, 4 pages.
(Continued)

*Primary Examiner* — Binh Q Tran
(74) *Attorney, Agent, or Firm* — Christensen O'Connor Johnson Kindness PLLC

(57) ABSTRACT

The disclosed subject matter relates to a hydraulic and electrical interface ring for a turbine engine, characterized in that said ring comprises fluid transfer pipes which axially pass therethrough and having axial ends that form axial interlocking means, the supporting means of at least one electrical device, and at least one electrical linking connector of the device, said connector being configured to engage by axial interlocking with a complementary electrical connector of another part.

14 Claims, 4 Drawing Sheets

(51) Int. Cl.
*F16C 33/66* (2006.01)
*F16N 21/00* (2006.01)
*F01D 7/00* (2006.01)

(52) U.S. Cl.
CPC ........ *F16N 21/00* (2013.01); *F05D 2220/325* (2013.01); *F05D 2260/57* (2013.01); *F05D 2260/70* (2013.01); *F05D 2260/76* (2013.01); *F16C 2360/23* (2013.01); *Y10T 29/49826* (2015.01)

(56) References Cited

U.S. PATENT DOCUMENTS

| | | | | |
|---|---|---|---|---|
| 7,414,413 B2 * | 8/2008 | Crum | ................ | G01B 7/14 324/662 |
| 7,775,052 B2 * | 8/2010 | Cornwell | ................ | F01D 17/02 60/740 |
| 8,200,410 B2 * | 6/2012 | Williams | ................ | F23N 1/002 422/220 |
| 8,408,082 B2 * | 4/2013 | Dahler | ................ | G01N 1/2247 73/863.01 |
| 8,961,139 B2 * | 2/2015 | Badre-Alam | ......... | B64C 11/008 416/144 |
| 9,003,801 B2 * | 4/2015 | Tate | ................ | F02C 7/26 60/39.094 |
| 2013/0318942 A1 * | 12/2013 | Kraemer | ................ | F23R 3/46 60/39.091 |

OTHER PUBLICATIONS

International Preliminary Report on Patentability dated Mar. 31, 2015, issued in corresponding International Application No. PCT/FR2013/052227, filed Sep. 24, 2013, 1 page.
International Search Report dated Feb. 3, 2014, issued in corresponding International Application No. PCT/FR2013/052227, filed Sep. 24, 2013, 2 pages.

* cited by examiner

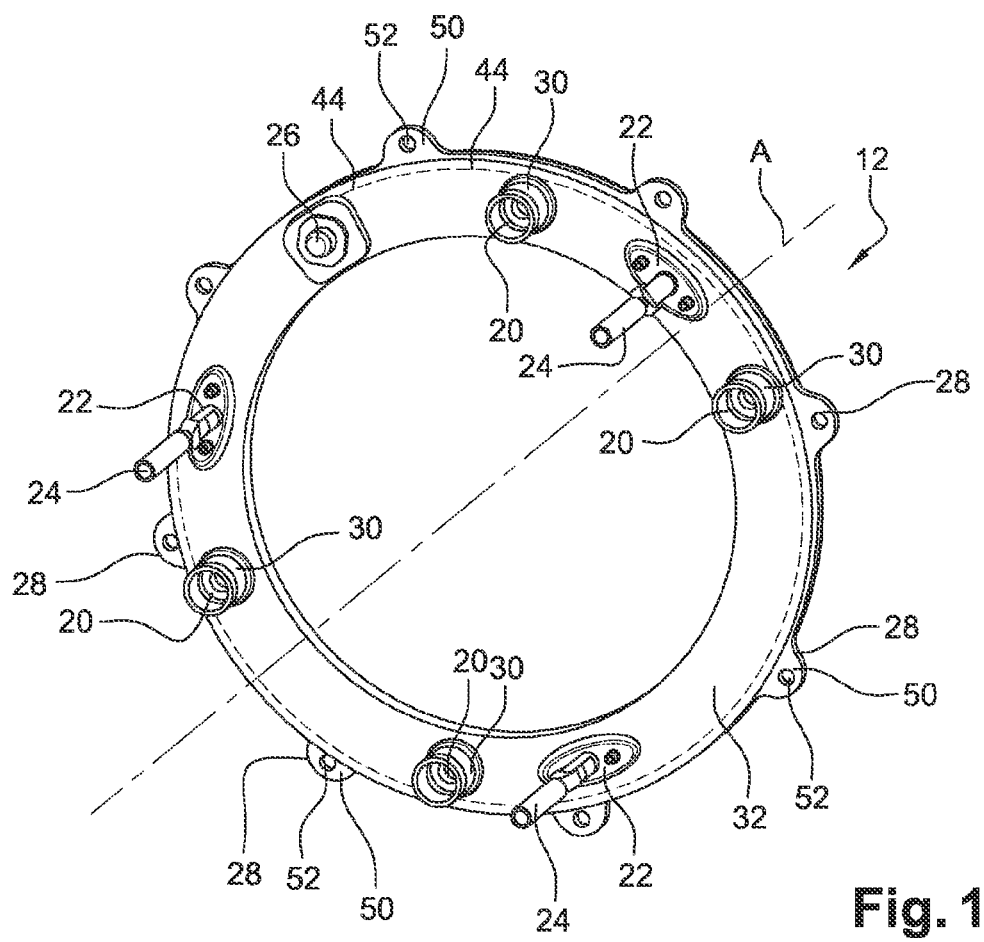
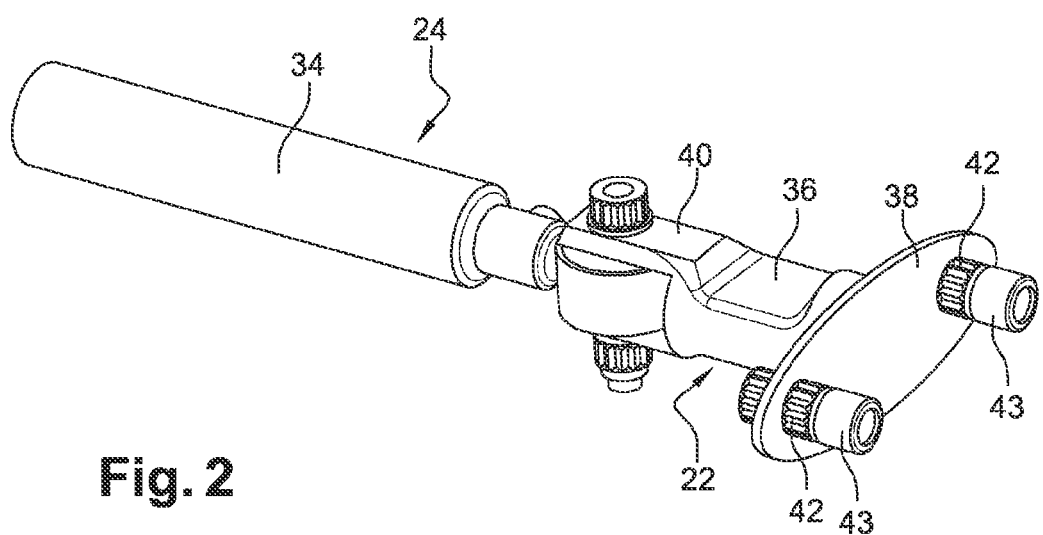
Fig. 1
Fig. 2

HYDRAULIC AND ELECTRICAL INTERFACE RING FOR A TURBINE ENGINE

TECHNICAL FIELD

The present disclosure relates to a hydraulic and electrical interface ring for a turbine engine, which is particularly suitable but not exclusively for supplying fluid (such as oil) to an open-rotor type linear turbine engine actuator.

BACKGROUND

An open-rotor type turbine engine mainly comprises, along a longitudinal axis and inside a cylindrical nacelle, supported by the structure of the aircraft (such as the rear portion of the fuselage of an aeroplane), a "gas generator" part and a "thruster" part (only the nacelle part covering the gas generator is fixed, whereas the nacelle parts in which the rotating casings are accommodated are rotational). The thruster part comprises two coaxial and counter-rotating propellers, which are upstream (front) and downstream (rear) respectively and comprise rotational casings having polygonal rings, and which propellers are set into opposite rotation from one another, for example, by a suitable mechanism which is driven by a power turbine which is located at the output of the gas generator part, the blades of the propellers extending radially outside the nacelle.

To allow optimum operation of the turbine engine in the various flight phases encountered, the blades of the counter-rotating propellers can rotate in the radial compartments of the rings. For this purpose, they are set into rotation about their respective pivot axes, by a suitable orientation system for varying the pitch of the blades during flight, that is to say the pitch of the propellers. For example, the blades can vary according to the system, from +90° to 30° for the flight phases, from +30° to −30° for the ground and thrust reversal phases, and can have a rapid return to 90°, in the feathered position, in the event of a malfunction in flight, for which the blades are retracted relative to the direction of travel of the aeroplane and cause as little drag as possible.

As a system for orienting the blades, that described in the French patent application of the applicant FR 11 58891 is known.

A technique allowing optimum lubrication of a bearing, which was developed by the applicant, was the subject matter of FR 12 56140 and consists in channelling the lubricating oil as far as the inside of the bearing, passing through the actuator.

SUMMARY

The present disclosure proposes examples of a hydraulic and electrical interface ring for a turbine engine, characterised in that it comprises ducts for transferring fluid passing axially through the ring, and the axial ends of which form axial interlocking means, the ring further comprising means for supporting at least one electrical equipment, and at least one connector for electrically connecting the equipment, said connector being designed to interact by means of axial interlocking with an electrical connector which is complementary to another part.

The hydraulic and electrical interface ring makes it possible to integrate a plurality of functions or pieces of ancillary equipment in one and the same part, that is to say the ring, said ring being used to transfer fluid, such as oil, but also to support at least one (piece of) electrical equipment and the electrical connection means thereof. In addition, said ring is designed to facilitate the mounting thereof by means of axial interlocking on another part, for example in a blind manner, as will be described in detail below. The manufacture of said other part can also be simplified thereby.

In the present application, interlocking means is understood to mean means which are designed to engage in an interlocking manner in complementary means of another part or to receive in an interlocking manner complementary means of another part. The interlocking means are therefore of the male or female type.

In addition, hydraulic or electrical interface element is understood to mean an element which is capable of transferring or distributing a fluid such as oil from at least one first part to at least one second part, and of ensuring a connection or electrical connection between at least one first part and at least one second part, the electrically connected parts not necessarily being parts which are intended to provide and receive fluid. The element may be inserted between two of said parts. In the present disclosure, the ring is a hydraulic and electrical interface element which provides a transfer of fluid and an electrical connection.

Electrical equipment is understood to mean an equipment or a piece of equipment which is powered by electricity, which provides electrical power and/or which is designed to provide an electrical connection. Said (piece of) equipment may be an electric sensor, such as a position sensor, or merely an electrical conductor.

In the present application, the term electrical connector is used to refer to either a socket or a plug, the socket being intended to interact in an interlocking manner with a plug in order to provide an electrical connection.

The ring preferably comprises means for fastening to the other part. The ring comprises for example axial holes for the passage of screws which are intended to be screwed into nuts of the part.

The equipment supported by the ring is for example an axial position sensor, for example of the LVDT (linear variable differential transformer) type. The ring may thus comprise means for supporting at least one sensor of this type. These support means are preferably articulated to one end of the sensor by means of a ball-joint connection.

At least one of the ends of each duct is preferably tubular and projects axially on the ring. Said tubular ends form protrusions on the ring which form said interlocking means.

The present disclosure also relates to an assembly comprising a ring as described above and an annular collar, characterised in that the collar comprises a cylindrical bearing surface for centring the ring and an annular face for axially supporting the ring, an electrical connector being designed to interact by axial interlocking with the connector of the ring when the ring is axially supported on the collar, and longitudinal channels for circulating fluid, which each have a longitudinal end which is opposite an end of a duct of the ring and is intended to be connected to said end, for example by means of a fluid or hydraulic connection. Said connection may be associated with a swivel connection at each of the axial ends thereof.

Advantageously, the ring and the cylindrical bearing surface for centring the collar are designed to interact by means of sliding adjustment, that is to say with play, thereby making it possible to facilitate the mounting of the ring and to allow the dismounting thereof.

The collar may comprise holes in which nuts or inserts are accommodated. As indicated above, the ring may comprise axial holes for the passage of screws which are intended to be screwed into said nuts or inserts.

In a particular embodiment, a cavity for receiving fluid is made between the collar and the ring, said cavity being connected to the longitudinal ends of the channels in the collar and the ends of the ducts of the ring. The receiving cavity makes it possible to distribute the fluid from the collar towards the ring. Said receiving cavity may comprise a circular groove which is made in the collar and a circular groove which is made in the ring. Each of these grooves may extend over part of the circumference of the ring or of the collar.

The longitudinal channels in the collar may comprise pipes which are attached to the collar or may be formed in bosses on the collar.

The present disclosure also relates to a turbine engine module, comprising an assembly of the above-mentioned type which is mounted at an axial end of a linear actuator, said actuator comprising a fixed inner part and an outer part which can move in axial translation on the fixed part, the movable part defining chambers around the fixed part, at least one of said chambers being supplied with fluid by means of rods of which the axial ends opposite the actuator are designed to be interlocked in the ducts of the ring. The rods are preferably axial and telescopic. They may be associated with a swivel connection at each of the axial ends thereof.

The movable part of the actuator can be fastened to an end of at least one axial position sensor, for example of the LVDT type, the opposite end of which is fastened to the interface ring. Said sensor makes it possible to recognise in real time the axial position of the movable part of the actuator (and thus the pitch of the blades of the propeller when the actuator is used to orientate the blades of the propeller). In the case of an LVDT sensor, the transformer of said sensor can be located on the side of the ring and fastened thereto. Said transformer is connected to an electric cable which can thus be connected to the connector of the ring.

The present disclosure lastly relates to a method for mounting a module as described above, characterised in that said method comprises the steps consisting in:

assembling the actuator and mounting the ring at an axial end of the actuator in such a way that the axial ends of the rods which are opposite the actuator are interlocked in the ducts of the ring, moving the actuator and the ring in axial translation towards the collar until the ring is axially supported on the collar, the ducts of the ring are in fluid communication with the channels in the collar, and the connector of the ring is interlocked in the connector of the collar, and fastening the ring to the collar.

The method can additionally comprise one or more of the steps consisting in:

tightening fastening flanges of the collar and of the actuator, and pre-assembling a transfer bearing and transmission means of a system for orienting the blades of a propeller, before mounting the assembly on the actuator.

Mounting the actuator and the ring on the collar can be carried out in a blind manner, that is to say without seeing said collar. The pre-mounting of the ring on the actuator makes it possible to rigidify the ancillary equipment (for example telescopic rods, LVDT sensors, etc.) between said parts during mounting and to simplify the mounting. As explained above, said mounting is relatively simple because it is sufficient for the elements of the ring to be interlocked in complementary elements of the collar to produce the assembly. The interlocking means of the ring and/or of the collar can form foolproofing means which allow correct angular positioning of the parts relative to one another. Another advantage is that the ring makes it possible to avoid carrying out complex machining operations on the collar and to transfer these operations to the ring, which has a simpler shape and smaller dimensions.

DESCRIPTION OF THE DRAWINGS

The disclosure will be better understood and other details, advantages and features of the disclosure will become apparent by reading the following description given by way of non-limiting example, with reference to the accompanying drawings, in which:

FIG. 1 is a schematic perspective view of the hydraulic and electrical interface ring according to the disclosure, FIG. 2 is a schematic perspective view of an electrical sensor of the LVDT for the ring from FIG. 1, and of the support means thereof.

DETAILED DESCRIPTION

In the following description, the terms "upstream" and "downstream" refer to the direction of flow of the gases in a turbine engine.

Figure 3:
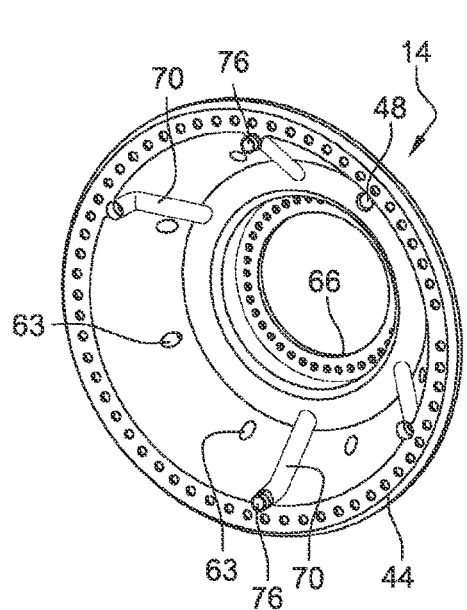
FIGS. 3 and 4 are schematic perspective views of an annular collar of an assembly according to the disclosure, seen from upstream and from downstream respectively.
Figure 4:
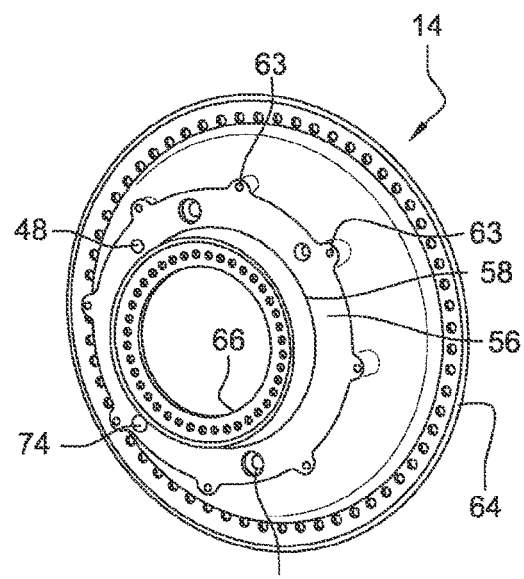
Figure 5:
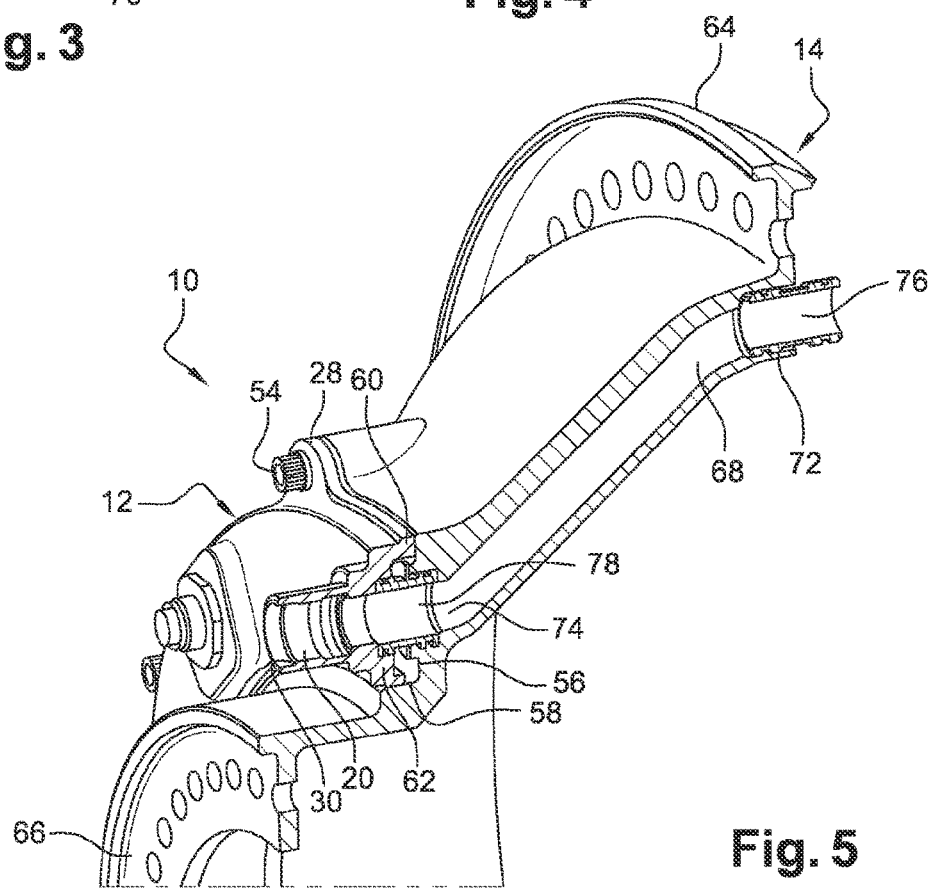
FIGS. 5 and 6 are schematic perspective and axial cross-sectional views of the assembly comprising the ring from FIGS. 1 and 2 and the collar from FIGS. 3 and 4.
Figure 6:
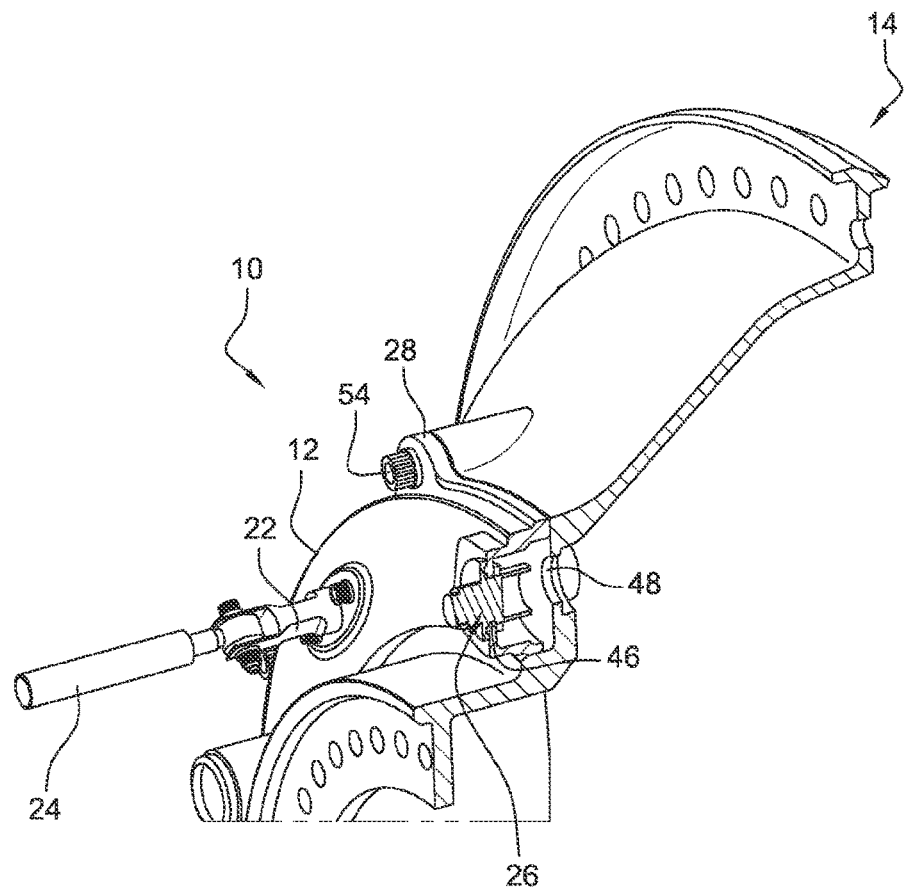

FIGS. 1 to 6 show an embodiment of an assembly 10, said assembly 10 which is visible in FIGS. 5 and 6 essentially comprising two members; a hydraulic and electrical interface ring 12 shown in FIG. 1 and an annular collar 14 shown in FIGS. 3 and 4. As will be described in greater detail below with reference to FIG. 7, said assembly 10 can be used to supply oil to a linear actuator 16 for setting the pitch of the blades 18 of an open-rotor type turbine engine propeller.

The ring 12 having an axis of rotation A comprises tubular ducts 20 for transferring oil, means 22 for supporting LVDT sensors 24, a connector 26 for electrical connection of said sensors 24, and means 28 for fastening to the collar 14.

The ducts 20 are substantially parallel to one another and to the axis A, and there are at least four thereof in the example shown. Said ducts 20 pass axially through the ring 12 and the rear or downstream ends thereof are defined by cylindrical end fittings 30 which project axially on a downstream radial face 32 of the ring. Each end of each of the ducts 20 is designed in this case to receive a fluid connection by interlocking, which connection may be merely a bushing or a telescopic tubular rod, as will be described in greater detail below.

FIG. 2 shows on a larger scale the means 22 for supporting an LVDT sensor 24 and said LVDT sensor.

In a known manner, an LVDT sensor 24 comprises a ferromagnetic core which is mounted in an axially sliding manner inside a cylinder 34 comprising a transformer. The movement of the core leads to a modification of the distribution of the magnetic fields inside the transformer. The distribution of the fields thus depends on the axial position of the core in the transformer. This type of sensor can thus be used to determine the axial position of an integral part of the core of the sensor, relative to another integral part of the cylinder of the sensor.

The support means 22 from FIG. 2 comprise a socket 36, one end of which is connected to a plate 38 for fastening to the ring 12, and the other end of which comprises a yoke 40 for articulation on an end of the cylinder 34 of an LVDT sensor.

The plate 38 is applied to an upstream boss (which could be used to mount another type of electrical equipment) on the ring 12 and is fastened to the ring by screws which pass through holes 42 in the plate and are screwed into inserts 43 which are accommodated in blind holes in the boss on the ring. The yoke 40 is preferably articulated on the end of the cylinder 34 by a ball-joint connection.

In the mounting position, the longitudinal axes of the cylinders 34 of the sensors 24 are parallel to one another and to the axis A. The sensors 24 are located on the same (downstream) side as the end fittings 30 of the ducts 20.

The sensors 24, and in particular the transformers of the cylinders 34, are connected to the electrical connector 26 by electric cables, which are shown schematically by dotted lines 44 in FIG. 1. Said cables 44 preferably all pass in the same direction around the ring 12 as far as the connector 26 and merge with one another as soon as possible.

The connector 26 comprises for example a (male or female) plug which is mounted in an axial hole 46 in the ring and is intended to interact with a (female or male) complementary socket of a connector which is mounted in an axial hole 48 in the collar (FIG. 6, the socket not being shown for the sake of clarity).

The fastening means 28 of the ring 12 in this case have an annular row of tabs 50 which extend radially towards the outside from the outer periphery of the ring. Said tabs 50 comprise axial holes 52 for the passage of screws 54 which are intended to be screwed into nuts which are supported by the collar 14. Said holes 54 can be used to fasten clamps for holding the electric cables 44.

The collar 14 has a generally frustoconical shape, the end thereof having a smaller diameter being located downstream. The ring 12 is intended to be mounted on said downstream end which comprises a downstream radial face 56 for axially supporting the ring and a cylindrical bearing surface 58 for centring the ring during the mounting thereof.

The ring 12 comprises a cylindrical edge 60 on the outer periphery thereof which faces upstream and the free upstream end of which is intended to be axially supported by the face 56 of the collar 14. The ring 12 further comprises a cylindrical edge 62 on the inner periphery thereof which faces upstream and the inner surface of which interacts in a sliding manner with the bearing surface 58 of the collar 14 during the mounting of the ring (FIGS. 4 and 5). Due to the presence of said two respectively radially outer and inner cylindrical edges 60 and 62, the ring 12 has a substantially U-shaped cross section, the opening of which faces axially upstream, the edges 60 and 62 defining an annular groove therebetween which is closed in the upstream direction by the collar 14.

The collar 14 also has an annular row of holes 63 in which nuts (not shown in the drawings) are fixed for screwing the screws 54 for fastening the ring 12. In a variant, the collar could comprise bosses in which blind holes would be formed to accommodate inserts for screwing the screws 54, said inserts being for example similar to the inserts 43 mentioned above.

The collar further comprises, at each of the axial ends thereof, an annular fastening flange 64, 66 comprising holes for the passage of screw-nut type means.

The collar 14 also comprises longitudinal channels 68 for circulating oil, substantially from the upstream flange 64 as far as the radial face 56. There are four of said channels 68 in the example shown and said channels are formed in longitudinal bosses 70 which project on the inner frustoconical surface of the collar 14 (FIGS. 3 and 5). Due to the frustoconical shape of the collar 14, the upstream ends 72 of the channels 68 (forming oil inlets), which are located on a circumference having a diameter which is greater than that of the circumference on which the downstream ends 74 of the channels (which form oil outlets) are located.

The upstream end 72 of each channel 68 receives in an interlocking manner an axial end of a tubular hydraulic connection 76. The downstream end 74 of each channel 68 receives in an interlocking manner an axial end of another tubular hydraulic connection 78, the opposite axial end of which is interlocked in the upstream end of a duct 20 of the ring 12. In this case, the connections 76, 78 are in the form of bushings. Each connection 76, 78 may comprise a sealing joint at each of the axial ends thereof and an outer annular flange for axial support on the collar 14. Preferably, the connections 76, 78 each have a passage cross section which is substantially the same as that of the end fitting 30 and of the duct 68 which are associated with said connection. The use of a connection 78 instead of an end fitting which is produced directly on the ring 12 has the advantage of facilitating the manufacture of the ring and of reducing the geometric constraints of the assembly.

Figure 7:
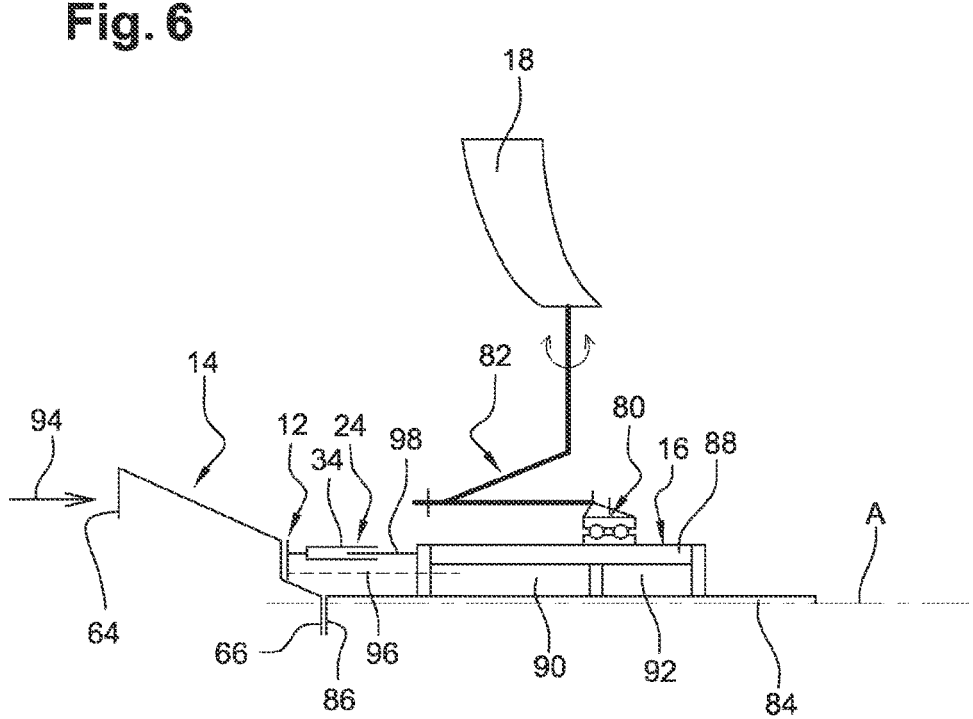
FIG. 7 is a schematic view of a system for orienting the pitch of the blades of a turbine engine propeller, comprising a linear actuator and an assembly according to FIGS. 5 and 6 which is mounted upstream of said actuator.

As explained above, the assembly 10 formed by the ring 12 and the collar 14 can be used for supplying oil to a linear actuator 16 for orienting the pitch of the blades 18 of an open-rotor type turbine engine propeller (FIG. 7).

The blades 18 of the propeller are of the variable-pitch type, that is to say that they can be orientated around the radial axes thereof by means of a system for controllably orienting the pitch of the blades, in such a way that they occupy a desired optimum angular position according to the operating conditions of the turbine engine and the flight phases in question (rotation of the blades in both directions with increasing and decreasing propeller angles, and return of the blades to the feathered position in the event of malfunction).

The system for orienting the blades 18 of the propeller comprises the linear movement actuator 16 which is centred on the axis A, a bearing 80 for transferring movement, and transmission means 82 for providing the angular rotation of the blades.

The actuator 16 is annular and comprises a cylindrical fixed part 84, the upstream end of which comprises an annular flange 86 for fastening to the downstream flange 66 of the collar 14. Around the fixed part 84 is located an annular part 88 which can move in an axially sliding manner on the fixed part 84.

The movable part 88 defines two annular chambers 90, 92 around the fixed part 84, which chambers are upstream and downstream respectively and are filled with oil and are connected to means for supplying oil and discharging oil. For example, supplying oil to the upstream chamber 90 leads to an increase in the volume thereof and to a movement of the movable part 88 upstream.

The transfer bearing 80 is mounted on the movable part 88 of the actuator, the bearing 80 in this case being a double-row ball bearing, the inner ring of which is fastened to the movable part 88 in that it is connected thereto for conjoint translational movement, and the outer ring is connected to the blades 18 by the transmission means 82.

Said transmission means 82 comprise for example connecting rods 36. As the movable part 88 moves axially (in one direction or the other), the inner ring of the bearing 80, which is rigidly connected to the movable part, drives the outer ring by contacting the balls, and pulls on the connecting rods, making it possible to modify the pitch angle of the blades 18.

The assembly 10 described above can be used in particular for transferring oil from an upstream source (arrow 94) as far as at least one of the chambers 90, 92 of the actuator 16 and the bearing 80 for the lubrication thereof. For this purpose, telescopic tubular rods 96 for fluid connection (shown schematically by dotted lines) extend parallel to the axis A and have downstream ends in fluid communication with the chamber 90 for example or means for lubricating the bearing 80, and upstream ends which are interlocked in the above-mentioned tubular end fittings 30 of the ducts 20 of the ring. The number of rods 96 is equal to the number of ducts 20 of the ring 12 and there are therefore four thereof in the example shown; two for supplying oil to the chamber 90 and two for lubricating the bearing 80 for example. Preferably, the upstream end of each rod 96 is interlocked in an end fitting 30 by means of a swivel connection. Each duct 20 may comprise an inner thread for screwing a nut for fastening a telescopic rod 96.

Thus, the oil which penetrates the channels 68 in the collar 14 flows downstream and into the ducts 20 of the ring, then into the telescopic rods 96 so as to be transported as far as the chamber 90 and the bearing 80.

The reference sign 98 denotes a ferromagnetic core of one of the LVDT sensors 24, said core extending parallel to the axis A and being fastened to the movable part 88, preferably by a swivel connection. The core 98 is mounted in a sliding manner in one of the cylinders 34 which are supported by the ring 12, as described above.

The swivel connections for fastening the sensors 24 and the telescopic rods 96 make it possible to compensate any possible misalignments between the parts on which they are fastened, in order to avoid bowing thereof.

The assembly 10 and the actuator 16 form a turbine engine module which can be assembled in the following manner:

during a first step, the actuator 16 is assembled and the ring 12 is mounted upstream of the actuator in such a way that the axial ends of the ends of the telescopic rods 96 which are opposite the actuator are interlocked in the end fittings 30 of the ducts 20 of the ring, the actuator and the ring are then positioned angularly around the axis A in such a way that, in particular, the connector 26 of the ring is aligned axially with that of the collar 14 (the ring can be equipped with foolproofing means which are intended to interact with complementary means of the collar so as to facilitate said positioning), the actuator and the ring are then moved in axial translation towards the collar 14 until the ring is axially supported on the collar, the connections 78 which were previously mounted on the collar then interlock in the ducts 20 of the ring, and the connector 26 of the ring interlocks in that of the collar, the ring and the collar are then fastened together by tightening the screws 54; the tightening of the screws 54 provides the locking of the module and the electrical connection between the connectors of the ring and of the collar, the flanges 66 and 86 are pressed against one another, and the bearing 80 and the transmission means 82 are pre-assembled and can then be mounted on the actuator 16.

Said assembly can be produced vertically, during mounting, by the engine being oriented so that the axis A is vertical.

Figure 8:
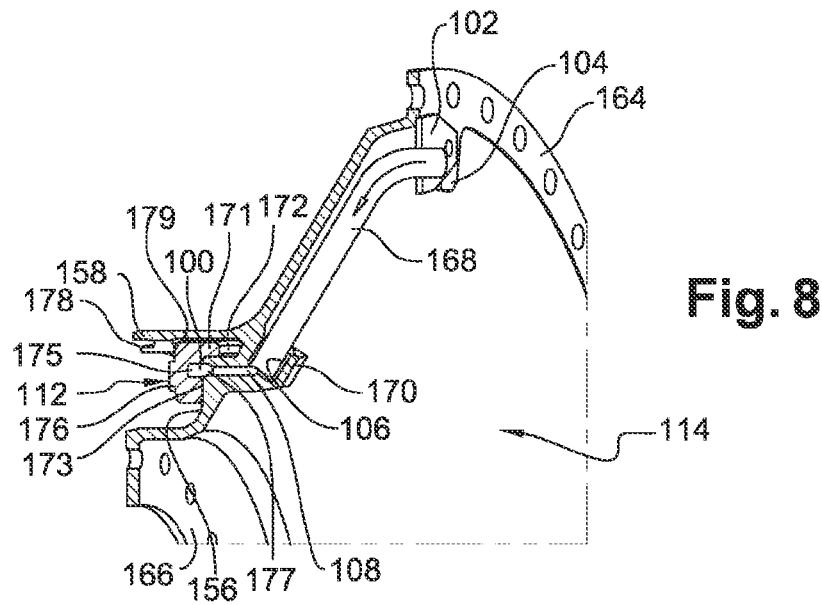
FIG. 8 is a partial perspective view of the collar and of the ring according to a variant of the disclosure.
Figure 9:
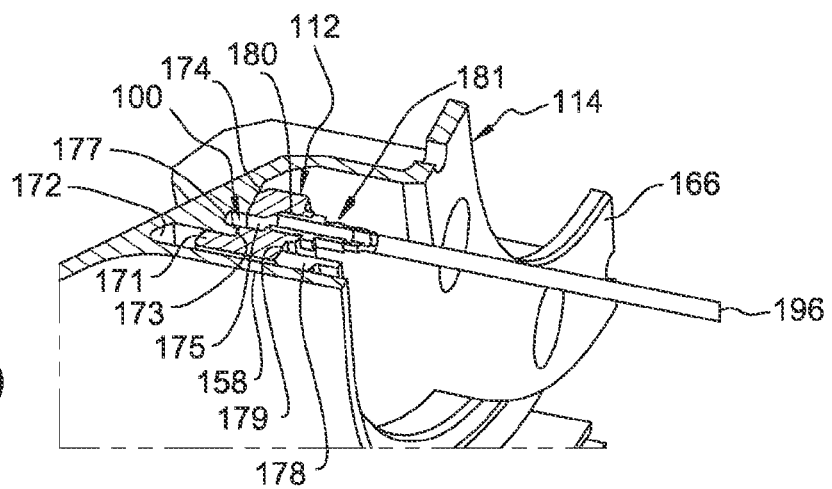
FIG. 9 is a partial perspective and axial cross-sectional view of the ring and of the collar from FIG. 8.
Figure 10:
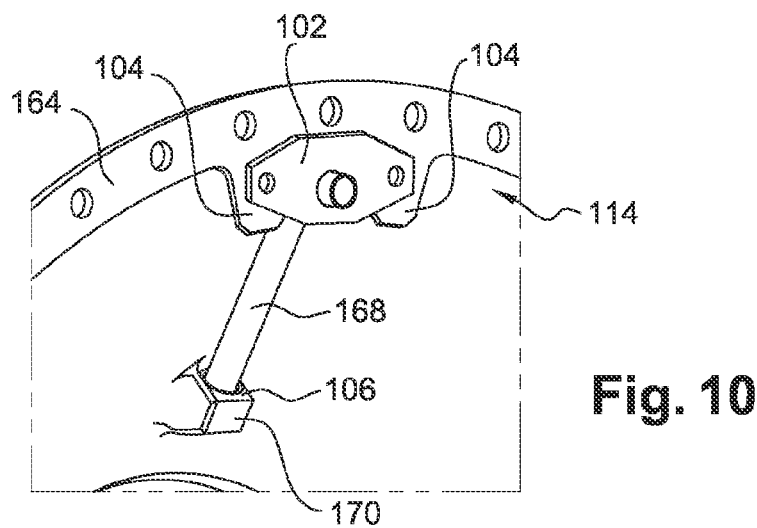
FIG. 10 is a partial perspective view of the collar from FIG. 8.

FIGS. 8 to 10 show a variant of the i_disclosure in which the ring 112 is intended to collect the lubricant coming from the collar 114 and transfer it to telescopic rods 196 to supply the actuator (not shown).

In order to provide such a transfer, the ring 112 is attached axially to the downstream or rear side of the collar 114, rotated externally towards the actuator, relative to the flow passing through the engine of the turbine engine, by making, between the ring 112 and the collar 114, a sealed cavity 100 for receiving the lubricant, connecting the input and output supplies, as will be seen later.

Close to the outer flange 164, on the side of the front or upstream face of the collar 114, there is located a support 102 which is arranged on a retaining tab 104 of the collar to receive the end of a pipe 168, the other end of which engages, in a sealing manner, in the hole 106 of a boss 170 which is close to the inner flange 166. Thus, the pipe 168 radially follows the frustoconical wall of the collar, extending along the front face thereof. In the end of the pipe 168, which is connected to the support 102, the input supply of lubricant is connected in a sealing manner. In the bottom of the boss 170, an axial through-hole 108 is pierced in the thickness of the wall of the collar, and opens into the inner cavity 100 in the ring, in such a way as to lead the oil into the cavity. The hole 108 is pierced from the rear side of the collar so as to open into the bottom of the hole 106 in the boss 170, the wall of which prevents piercing from the front side of the collar.

In the embodiment shown, the ring 112 is mounted concentrically in an annular support part 158 forming a receiving compartment for the ring and issuing axially from the wall of the collar. In order to ensure the placement and centring thereof, the ring also has an annular projection 171 which engages in a complementary receiving cutout 172 made in the collar. This takes place until the front transverse face 173 of the wall 176 of the ring 112 interacts with the rear face 174 of the wall of the collar, and, between said faces, the annular cavity 100 is provided, which extends substantially over half the circumference. The ring 112 is thus in axial abutment against the collar 114.

The cavity 100 is obtained in this case by a substantially semi-circular groove 175 which is made in the wall 176 of the front face 173 of the ring and by a corresponding groove 177 which is made in the wall of the rear face of the collar. The two joined grooves 175, 177 thus form the cavity 100 and the through-hole 106 communicating with the pipe 168 for the inflow of the lubricant opens in the bottom of the groove of the collar, as shown in FIG. 8. The sealing of the cavity 100 between the ring 112 and the collar 114 can be produced by the direct surface contact of the opposing faces 173, 174 thereof, in particular due to the fact that the lubricating oil pressure is relatively reduced, or, in a variant, by one or more joints (not shown).

The axial pressing of the ring 112 against the collar 114 is obtained by a retaining nut 178 which is screwed into a thread of the support part 158 of the collar which is used for the centring, and which is applied against the rear outer face 179 of the ring, pressing said face against the collar.

In addition, in order to provide a single possible assembly position during the mounting of the ring on the collar, ensuring in particular that the grooves 175, 177 correspond, a foolproofing means is provided, which additionally interconnects the collar and the ring for conjoint rotation. Although it is not shown, said means can comprise a specific male-female assembly (such as teeth and hollows provided in the ring and the collar) allowing the connection in rotation and the interaction of said teeth and hollows in a single position).

As shown in FIG. 9, in the bottom of the semi-circular groove 175 of the ring are provided, in this example, two through-holes 180 which are substantially located at the ends of said groove, that is to say in diametrically opposite positions.

Hydraulic connections or connectors 181 are engaged in said holes 180 for the connection between the cavity 100 and the telescopic rods 196, as shown in particular in FIG. 9.

The other ends of the rods 196, which are opposite those which are connected to the connectors 181, can each have a profile which makes it possible to receive a joint or the like to facilitate the sliding with the cavity to be supplied in the movable part of the actuator during movement. The joint cannot avoid potential misalignments but, by contrast, it advantageously compensates them by introducing a ball-joint function between the rod for injecting the lubricant and the channel to be supplied whilst preserving the sealing between the rod and the channel in the event of small misalignments therebetween.

Providing two (or more) diametrically opposite holes 180 in the ring 112, to which holes the rods 196 are connected, makes it possible to advantageously distribute the lubricant in a uniform manner in the bearing. Carrying out a supply at a plurality of points on the ring in order to supply a plurality of rods and, thus, a plurality of channels, from a single common supply source is one of the major advantages of the disclosure.

In the front transverse face 173 of the ring 112, a curved groove can be made, substantially on the remaining part of the ring where the semi-circular groove 175 for the lubricant is absent. Said curved groove substantially follows the lubricant groove 175, by being approximately in the circular extension thereof, and can define an arc of less than 180°. Of course, said arc could take any other value according to requirements. At the centre of the groove, a site can be provided for receiving and fastening an electrical connector.

The rear transverse face 179 of the ring 112 can comprise sites (compartments or holes) for receiving sensors and telescopic rods 196 respectively. Said sites face the control mechanism of the actuator and are arranged in such a way that the rods are opposite the receiving cavity of the actuator, leading to the bearing to be lubricated, and that the coaxiality of the parts of the sensors is ensured. With regard to the collar 114, said collar may have, opposite the connector which is fastened to the ring 112, a cutout which is made in the transverse wall thereof, in such a way as to be able to connect to the connector, which is fastened to the distribution ring, a cable which is equipped with a suitable complementary connector.

Therefore, the disclosure not only makes it possible to transfer, from the inside of the collar 114 (from a single supply) to the outside thereof (through a plurality of outlets), and completely reliably, lubricant towards the bearing of the system for orienting the blades of the propeller in question, and high pressure lubricant towards the actuator through input supplies inside the casing of the turbine engine, but also to provide instrumentation support for sensors, making it possible to advantageously connect said sensors via a single connector to an electrical power supply coming from the inside of the casing.

The invention claimed is:

1. Hydraulic and electrical interface ring for a turbine engine, comprising:
   ducts configured to transfer fluid passing axially through the ring, the axial ends of which form axial interlocking means;
   an electrical equipment support; and
   at least one connector configured to electrically connect an electrical equipment supported by the electrical equipment support, said connector being configured to interact by axial interlocking with a complementary electrical connector of another part.

2. The ring according to claim 1, further comprising means for fastening to said other part.

3. The ring according to claim 1, wherein the electrical equipment includes at least one axial position sensor.

4. The ring according to claim 3, wherein the electrical equipment support is articulated to one end of the sensor by a ball-joint connection.

5. The ring according to claim 1, wherein at least one of the ends of each duct is tubular and projects axially on the ring.

6. An assembly, comprising:
   a hydraulic and electrical interface ring including
      ducts configured to transfer fluid passing axially through the ring, the axial ends of which form axial interlocking means;
      elements for supporting at least one electrical equipment; and
      at least one connector configured to electrically connect the equipment, said connector being configured to interact by axial interlocking with a complementary electrical connector of another part; and
   an annular collar including a cylindrical bearing surface for centering the ring and an annular face for axially supporting the ring, an electrical connector configured to interact by axial interlocking with the at least one connector of the ring when the ring is axially supported on the collar, and longitudinal channels configured to circulate fluid, which each have a longitudinal end which is opposite an end of a duct of the ring and adapted to be connected to said end by a fluid connection.

7. The assembly according to claim 6, wherein the collar comprises holes in which nuts or inserts are accommodated, the ring comprising axial holes for the passage of screws which are adapted to be screwed into said nuts or inserts.

8. The assembly according to claim 6, wherein a cavity configured to receive fluid is provided between the collar and the ring, said cavity being connected to the longitudinal ends of the channels in the collar and to the ends of the ducts of the ring.

9. The assembly according to claim 8, wherein the cavity comprises a circular groove which is provided in the collar and a circular groove which is provided in the ring.

10. The assembly according to claim 6, wherein the longitudinal channels comprise pipes which are attached to the collar or are formed in bosses on the collar.

11. Turbine engine module, comprising an assembly according to claim 6, which is mounted on an axial end of a linear actuator, said linear actuator comprising a fixed inner part and an outer part which can move in translation on the fixed inner part, the movable outer part defining chambers around the fixed inner part, at least one of said chambers being supplied with fluid by rods of which the axial ends opposite the linear actuator are configured to be interlocked in the ducts of the ring.

12. The module according to claim 11, wherein the movable part of the actuator is fastened to an end of at least one axial position sensor, the opposite end of which is fastened to the ring.

13. Method for mounting a turbine engine module having an assembly according to claim 6, said method comprising:
  providing a linear actuator comprising a fixed inner part and an outer part which can move in translation on the fixed inner part, the movable outer part defining chambers around the fixed inner part, at least one of said chambers being supplied with fluid by rods of which the axial ends opposite the linear actuator are configured to be interlocked in the ducts of the ring;
  mounting the ring of the assembly at an axial end of the actuator in such a way that the axial ends of the rods which are opposite the actuator are interlocked in the ducts of the ring;
  moving the actuator and the ring in axial translation towards the collar, until the ring is axially supported on the collar, the ducts of the ring are in fluid communication with the channels in the collar, and the connector of the ring is interlocked with the electrical connector of the collar; and
  fastening the ring to the collar.

14. The ring according to claim 1, further comprising at least one hole for receiving a fastener for fastening the ring to said other part.

\* \* \* \* \*